(12) United States Patent
Polgar

(10) Patent No.: US 8,844,496 B2
(45) Date of Patent: Sep. 30, 2014

(54) INTERNAL COMBUSTION ENGINE WITH SEPARATE COMBUSTION CHAMBER AND A METHOD TO ACHIEVE MODIFIED AND CONTROLLED AUTOIGNITION IN SAID CHAMBER

(76) Inventor: Jeno Polgar, Sopron (HU)

( * ) Notice: Subject to any disclaimer, the term of this patent is extended or adjusted under 35 U.S.C. 154(b) by 243 days.

(21) Appl. No.: 13/338,824

(22) Filed: Dec. 28, 2011

(65) Prior Publication Data

US 2012/0160223 A1    Jun. 28, 2012

Related U.S. Application Data

(63) Continuation-in-part of application No. PCT/HU2010/000076, filed on Jun. 29, 2010.

(30) Foreign Application Priority Data

Jun. 29, 2009 (HU) .................................... 0900410
Sep. 23, 2009 (HU) .................................... 0900598

(51) Int. Cl.
    *F02B 19/00* (2006.01)
(52) U.S. Cl.
    USPC .................... 123/256; 123/657; 123/193.2
(58) Field of Classification Search
    CPC .................... F02B 19/02; F02B 19/10
    USPC .......... 123/193.2, 256, 258, 259, 261, 264, 123/275, 285, 286, 291, 293, 657–671
    See application file for complete search history.

(56) References Cited

U.S. PATENT DOCUMENTS

| | | | | |
|---|---|---|---|---|
| 4,372,264 A | * | 2/1983 | Trucco | 123/255 |
| 4,846,125 A | * | 7/1989 | Hareyama et al. | 123/292 |
| 5,010,860 A | | 4/1991 | Broussard | |
| 5,054,443 A | * | 10/1991 | Kawamura | 123/254 |
| 5,115,775 A | | 5/1992 | Gruenwald | |
| 5,454,356 A | * | 10/1995 | Kawamura | 123/254 |
| 5,603,298 A | * | 2/1997 | Kawamura | 123/254 |
| 6,311,486 B1 | | 11/2001 | Negre et al. | |

FOREIGN PATENT DOCUMENTS

| | | |
|---|---|---|
| GB | 0505713 A | 5/1939 |
| JP | 9004462 A | 1/1997 |
| WO | 2007006062 A1 | 1/2007 |

* cited by examiner

*Primary Examiner* — Hung Q Nguyen
(74) *Attorney, Agent, or Firm* — Dowell & Dowell, P.C.

(57) ABSTRACT

An internal combustion engine having two combustion chambers separated by separate valves from each piston cylinder and wherein each cylinder has a suction valve and an exhaust valve and each combustion chamber has at least one fuel nozzle for injecting fuel into the respective chambers by several discrete injections with short dwell times therebetween. During a combustion cycle air is introduced into the chambers from opening to closing of the valves during a 720° rotation of a crankshaft and then combusting air-fuel mixtures during a subsequent period between the closing to opening of the valves during at least a further 720° rotation of the crankshaft and while making partial and spaced injections of fuel into the chambers at predetermined angular displacements of the crankshaft.

11 Claims, 16 Drawing Sheets

Fig. 9.
a.)
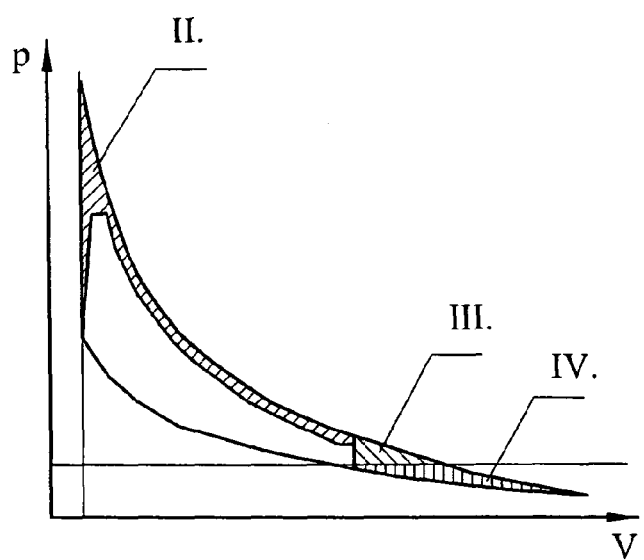
b.)
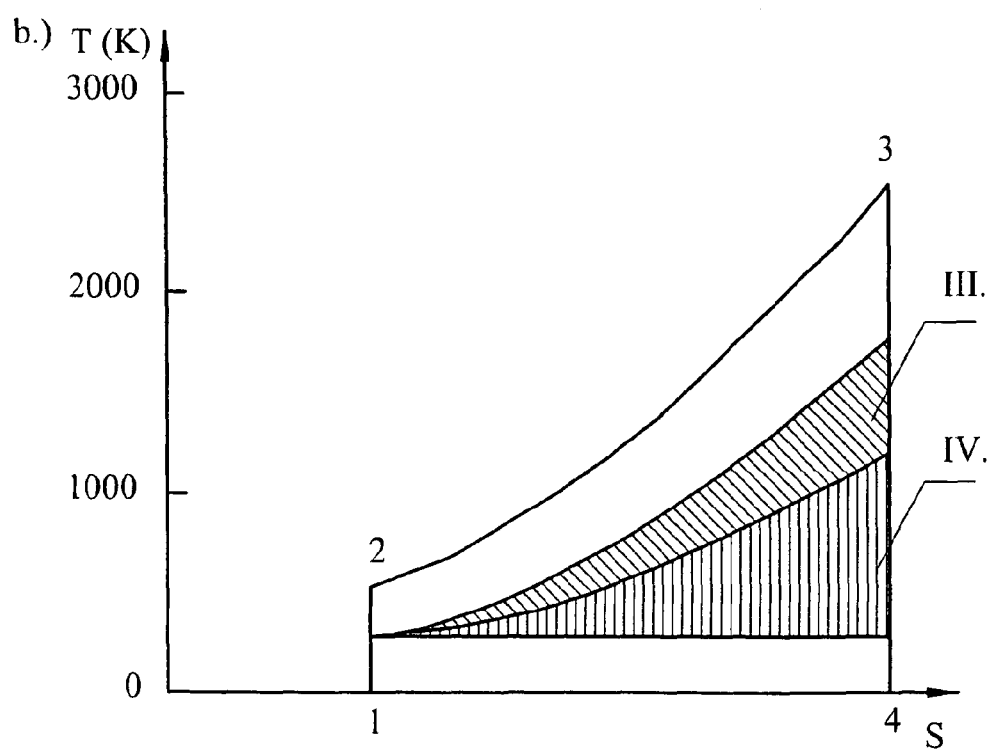

Fig. 10.
a.)
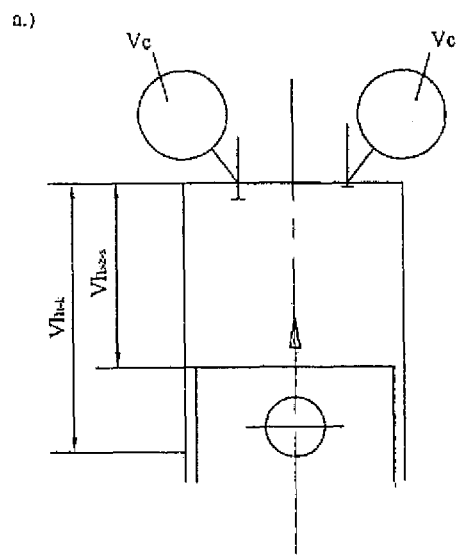
b.)
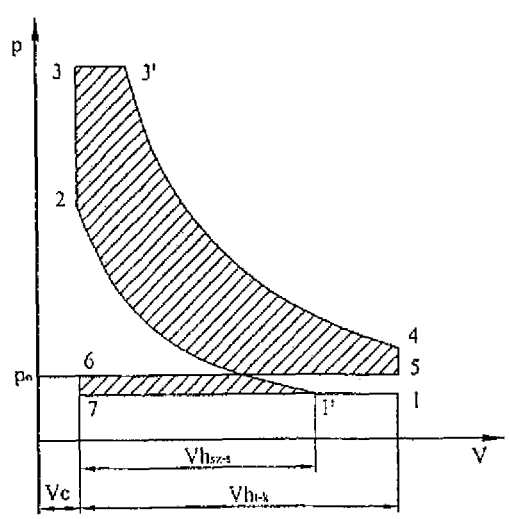

INTERNAL COMBUSTION ENGINE WITH SEPARATE COMBUSTION CHAMBER AND A METHOD TO ACHIEVE MODIFIED AND CONTROLLED AUTOIGNITION IN SAID CHAMBER

BACKGROUND OF THE INVENTION

1. Field of the Invention

This invention relates to a fuel oil (diesel), gas or petrol operated internal combustion engine with at least two combustion chambers separated by valves from its cylinder housing a piston, and having a suction valve and an exhaust valve both opening to the cylinder, and a crankshaft. The invention also relates to a method to control the combustion process of a fuel oil (diesel), gas or petrol operated internal combustion engine provided with at least two combustion chambers separated by valves from its cylinder housing a piston, and having a suction valve and an exhaust valve both opening to the cylinder, and having a crankshaft, wherein said combustion process achieved in said combustion chambers separated by valves from its cylinder is built up by sub-processes including HCCI (Homogeneous Charge Compression Ignition) and CAI (Controlled Autoignition).

2. Brief Discussion of the Related Art

Before treating the problem to be solved by the invention, the meaning of HCCI (Homogeneous Charge Compression Ignition) process is to be defined. This is doubly necessary so as a great confusion can be observed in the technical field of ignition processes. In this patent application all ignition processes established by compression ignition of a (comparatively) homogeneous fuel charge, independently of the fuel type, will be mentioned as HCCI ignition process.

Operating cycle of combustion engines involves losses due to different reasons resulted in utilizing less portion of introduced heat energy as mechanical power.

Several attempts have been made for decades to eliminate losses incurring due to constructional solutions of combustion engines. Decreasing losses namely would lead to fuel reduction, improved workload as well as to a more balanced running of the engine, moreover, extremely high power engines having low relative weight and operating at high rotational speed could be built, the specific power factors would be improved and less exhaust gases and harmful materials would be emitted.

Substantial losses of reciprocating piston engines (Otto-engines, Diesel-engines and gas-engines) are as follows: high frictional loss, finite combustion rate (heat transfer does not occur at constant volume), losses occurring through the cylinder wall and imperfect expansion of combustion gases (it does not last up to the ambient pressure and temperature). Losses of a petrol engine are summarised according to F.A.F. Schmidt in Table 1.

TABLE 1

| Denotation | Reason of loss | Degree in percent (%) of heat value |
|---|---|---|
| I | Friction | ~4 |
| II | Work of charge's change, wall loss, finite combustion rate, etc . . . | ~5 |
| III | Imperfect expansion of combustion gases (not up to the environmental pressure) | ~13 |

TABLE 1-continued

| Denotation | Reason of loss | Degree in percent (%) of heat value |
|---|---|---|
| IV | Imperfect expansion of combustion gases (not up to the environmental temperature) | ~22 |
| V | Irreversibility of combustion process (expansion could not last till 0 K) | ~25 |
| Total | | ~69 |

Losses denoted by I. and II. constitute power losses and losses denoted by III., IV., and V. are substantial losses. These losses are showed in a p-V diagram (see FIG. 9a.) and in a T-S diagram (see FIG. 9b.).

In the case of cylinder-piston-crankshaft engines the mechanical power yielded by the working process, and so the efficiency at a given compression rate, is the highest, if the combustion process takes place by the inner dead point at constant volume, after compression.

But, since the combustion rate is finite, the process of combustion lasts during the expansion stroke, extending also into the exhaust stroke (e.g.: in the case of diesel-engines).

This fact partly causes the power losses denoted by II. in Table 1.

Losses caused of finite combustion rate can be reduced by achieving a combustion process at constant volume.

This can be established by separating stroke volume from the combustion volume (combustion chamber) through valves.

Such a solution can be know from patent GB 505,713 disclosing an internal combustion engine of compression ignition type with a separate combustion chamber to receive the fuel, and one or more valves between the cylinder space and the combustion chamber. The valves are so moved as quickly to reduce the transfer cross-sectional area between the combustion chamber and the working space of the cylinder to its minimum value, which may be zero, shortly before the end of the compression stroke. After the working piston has passed its inner dead centre the transfer cross-sectional area gradually increases to its maximum in such a manner, that the pressure in the cylinder does not at any instant exceed a predetermined-pressure. The maximum value of the transfer crossectional area being retained till shortly before the end of the next compression stroke.

Patent document U.S. Pat. No. 5,115,775 discloses a two-cycle compression ignition engine including a first combustion chamber and a second combustion chamber located in said cylinder head, which combustion chambers being independently isolated from one another and from the clearance volume and each chamber defining a passageway in communication with said cylinder clearance volume, and an independently operated throttle valve for each combustion chamber and arranged for opening and closing said passageway associated with its respective chamber. The engine is provided by means for isolating the combustion process for one full 360 degree rotation of said crankshaft. The combustion chambers alternatively provide for expansion of combustion products in the respective chambers into the cylinder volume near top dead center upon each revolution of the crankshaft.

Solutions above—although contain the idea of compression volume(s) separated by valves from stroke volume and they could eliminate losses caused by finite combustion rate—are not suitable for achieving. Some problems are as follows:

combustion chambers are formed unfavourably in point of view of combustion process (particularly in U.S. Pat. No. 5,115,775), since the surface of combustion chamber depicted in the drawing is very large in relation to the volume thereof, resulted in a huge wall heat loss; the shape of the chamber does not enable to form a whirl in order to mix the injected fuel and the air;

in both solutions—but particularly in GB 505,713, where the applicant wants to adjust the pressure in the cylinder by means of choking (that is an irreversible pressure drop, that is a part of the pressure already built and achieved so hardly, will be lost)—huge choking losses are occurred, in both solutions—but particularly in U.S. Pat. No. 5,115,775—an extinctive effect acting to the combustion process is occurred because of the surface/volume rate of combustion chamber, the combustion will be incomplete particularly next to the wall surface, resulted in very large unburnt hydrocarbon and interstage combustion product content of the exhaust gases.

In addition, the solutions above:

do not provide a motor suitable for achieving HCCI ignition process, do not solve the problems associated with existing petrol engines (low compression rate, power regulation by choking, inadequate efficiency at partial load, etc.)

neither above solutions offer any solutions to the problem of expansion of the gases up to a pressure still above the ambient pressure during the power stroke, both have the risk of an imperfect or irregular combustion.

SUMMARY OF THE INVENTION

Therefore, one object of the present invention is to eliminate above problems by a. establishing HCCI (or almost HCCI) ignition processes,
b. improving efficiency of the motor by reducing losses,
c. reducing fuel consumption and environmental pollution.

These three aims actually cannot be separated, since the HCCI ignition process to be achieved strongly affects the efficiency of the motor, and measures taken in order to improve the efficiency feed back to the ignition process, and achieving the first and second aims the third aim will be also achieved, simultaneously. Nevertheless, in order to disclose the invention clearly, we are bgoing to attempt to separate the solutions.

With the construction of conventional reciprocating engines the combustion gases cannot expand up to the ambient pressure during power stroke. Experiments show that the energy loss relating to this effect is about 13% (% of the heat value). Ideal solution would be if the displacement volume was less during suction and compression strokes than during expansion and exhaust strokes. This way the expansion stroke can continue up to the ambient pressure—in practice, up to an experimentally predetermined pressure optimum.

Therefore, the object of the present invention is to provide a reciprocating combustion engine with separate combustion chambers separated by valves from the displacement volume, which is able to reduce also the losses originating from the expansion not lasting up to the ambient pressure, and further to regulate the combustion process of the engine such a way, that a better efficiency, a more favourable specific fuel consumption and less harmful waste emission will be obtained (HCCI combustion processes).

Alterations being necessary to achieve this object may be ranged among two groups:

1. constructional modifications,
2. modifications of control: achieving the most adequate ignition process by controlling the number of injections and other parameters.

ad. 1. In order to achieve a suitable motor for establishing a HCCI ignition process, we have substantially three tasks:

I. obtaining time for the ignition process;
solution: ignition process must be separated from the motor cycle and establishing it during the other parts of the cycle in a compression volume separated from the displacement volume of the cylinder by valves, thus obtaining a whole cycle time, i.e. 720° angular rotation of the crankshaft, to achieve the ignition process, obtaining a whirling air motion promoting rapid and full mixing of the fuel and air in the compression volume;
solution: the combustion chamber (compression volume) is shaped as a spherical or a cylindrical or a toroidal chamber, and the axis of the fuel injection nozzle is aligned with a secant line of a circular section lying in the symmetry plane of the chamber, that is using a swirl chamber, clearly seen in FIG. 1b., where swirling of air is depicted by empty-headed arrows.

II. using easily controllable injection nozzle(s) creating adequately fast and adequate number of short injection(s);
solution: using of piezo-injection nozzle(s).

ad. 2. By adequately controlling the parameters of injection a HCCI, or almost—HCCI ignition process can be achieved.

Tasks:

maintaining in a low level of the speed of pressure increase (pressure gradient);
solution: using subsequently elementary ignition processes, the number of which depends on the actual load, assuring a mixing of the air and fuel being as homogeneous as possible;
solution: duration time periods of injections possibly do not excess the ignition delay of fuel, according to actual thermodynamic state. The adequate mixing of vaporized fuel and air is allowed by swirling of air in the ignition chamber.

creating the most adequate ignition function.
solution adequately controlling the parameters of injection.

ad. b. Reducing losses caused by the expansion up to non environmental pressure.
solution: dividing the cycle of the motor into part-cycles (introduction-compression, and power-exhaust part cycles) to achieving different displacement volumes such a way, that during introduction-compression part cycle the displacement volume is less than the displacement volume during the power-exhaust part cycle.

ad. c.
solution: achieving a) and b).

This object has been achieved by providing an internal combustion reciprocating engine having a cylinder housing a piston and at least two separate combustion chambers separated by valves from the cylinder, and having a suction valve and an exhaust valve both opening to the cylinder, and having a crankshaft, and each said combustion chamber is provided by at least one fuel injection nozzle being able to inject fuel into the respective chamber by several discrete injections with short dwells therebetween.

The combustion chamber is shaped as a spherical or a cylindrical or a toroidal chamber, and the axis of the fuel injection nozzle is aligned with a secant line of a circular section lying in the symmetry plane of the chamber.

The engine according to the invention has preferably an even number of cylinders coupled by pairs to each other through at least two combustion chambers in parallel arrangement and provided by valves respectively opening to said combustion chambers, and each cylinder having a suction valve and an exhaust valve.

In an advantageous embodiment the engine according to the invention has an even number of cylinders coupled by pairs to each other through at least two combustion chambers in parallel arrangement and provided by valves respectively opening to said combustion chambers, and each cylinder having a suction valve or an exhaust valve.

The engine according to an embodiment has an even number of cylinders with different displacement volumes by pairs, and a cylinder with less displacement volume is provided by a suction valve and valves opening into the combustion chambers, and a cylinder with more displacement volume is provided by an exhaust valve and valves opening from the combustion chambers.

Cylinders have equal inner diameters, and a stroke length of the cylinder with less displacement volume is less than the stroke length of the cylinder with more displacement volume.

In an embodiment the cylinders have equal stroke lengths and the inner diameter of the cylinder with less displacement volume is less than the inner diameter of the cylinder with more displacement volume.

The object stated above has also been achieved by providing the method according to the invention to achieve regulation of combustion process of internal combustion reciprocating engine having a cylinder housing a piston and at least two separate combustion chambers separated by valves from the cylinder, and having a suction valve and an exhaust valve both opening to the cylinder, and having a crankshaft, comprising the steps of opening the suction valve in between opening and closing the valve and feeding combustion air into the compression volume of the cylinder, then closing the suction valve and forwarding said combustion air into the combustion chamber, and establishing a combustion process in the combustion chambers separated by valves from the compression volume of the cylinder, and opening the suction valve in between opening the valve and closing the same after a 720° rotation of the crankshaft, then feeding combustion air into the combustion chamber through the compression volume of the cylinder and closing the suction valve, then establishing said combustion process in a period lasting between the closing of the valve and opening of the same after at least a further 720° rotation of the crankshaft by means of partial injections of fuel taking place individually at predetermined angular displacements of the crankshaft in such a way, that injecting fuel in small quantities by a given number of partial injections into the combustion chamber at different angular position of the crankshaft by means of a fuel injection nozzle, and achieving combustion by autoignition as a result of huge compression rate of the engine.

The fuel injection nozzle is preferably a piezo-injection nozzle.

The number of partial injections is 1, and preferably between 1 and 6.

The fuel is chosen from the group consisting of petrol, diesel oil, natural gas and propane-butane gas.

In a preferred embodiment of the method according to the invention the combustion process is established by two groups of partial injections of fuel depending on the load level of the engine in such a way, that using a HCCI process injecting a first quantity of fuel being proportional to the load of the engine and being in accord with at most an optimal maximum in the compression stroke, and using a CAI process involving partial injections injected into the already closed combustion chamber at higher loads.

Specifically a single cylinder is provided, and closing the suction valve at a displacement volume next to the outer dead point.

BRIEF DESCRIPTION OF THE DRAWINGS

The invention will further be described in details by preferred embodiments referring to the drawings attached. In the drawings FIGS. 1a. and 1b. shows the separation of displacement volume and the compression volume by valves, FIG. 2. schematically shows the separation of displacement volume and the compression volume by valves, FIG. 3a, 3b. p=f($\phi$) diagrams of two subsequently sucked charges of a single-cylinder engine with valve opening diagrams at full load, FIG. 4. p=f($\phi$) summation curve at full load, FIG. 5. p=f($\phi$) diagram of an elementary combustion process, FIG. 6. p=f($\phi$) diagram of combustion process built up by elementary combustion processes, FIG. 7. p=f($\phi$) diagram of combustion process built up by elementary combustion processes, FIG. 8. p=f($\phi$) diagram of combustion process built up by elementary combustion processes, FIG. 9a., 9b. P-V and T-S diagrams of an operating cycle plotted with losses, FIG. 10a., 10b. shows the strokes by strokes establishment of different displacement volumes, in FIG. 11. the structure of a two-cylinder engine is shown, FIG. 12. shows the dividing of operating cycle into two parts, at a two-cycle engine, FIG. 13. shows the strokes by strokes establishment of different displacement volumes by pistons of different displacements, FIG. 14. shows the strokes by strokes establishment of different displacement volumes by pistons of different diameters, FIG. 15a., 15b. p=f($\phi$) diagrams of two subsequently sucked charges of a single-cylinder engine with valve opening diagrams of HCCI+CAI combustion process, at full load, FIG. 16. shows a graph of the theoretical efficiency of the Otto cycle against compression rate, parameter used is the K isentropic coefficient.

DESCRIPTION OF THE PREFERRED EMBODIMENTS

Figure 1:
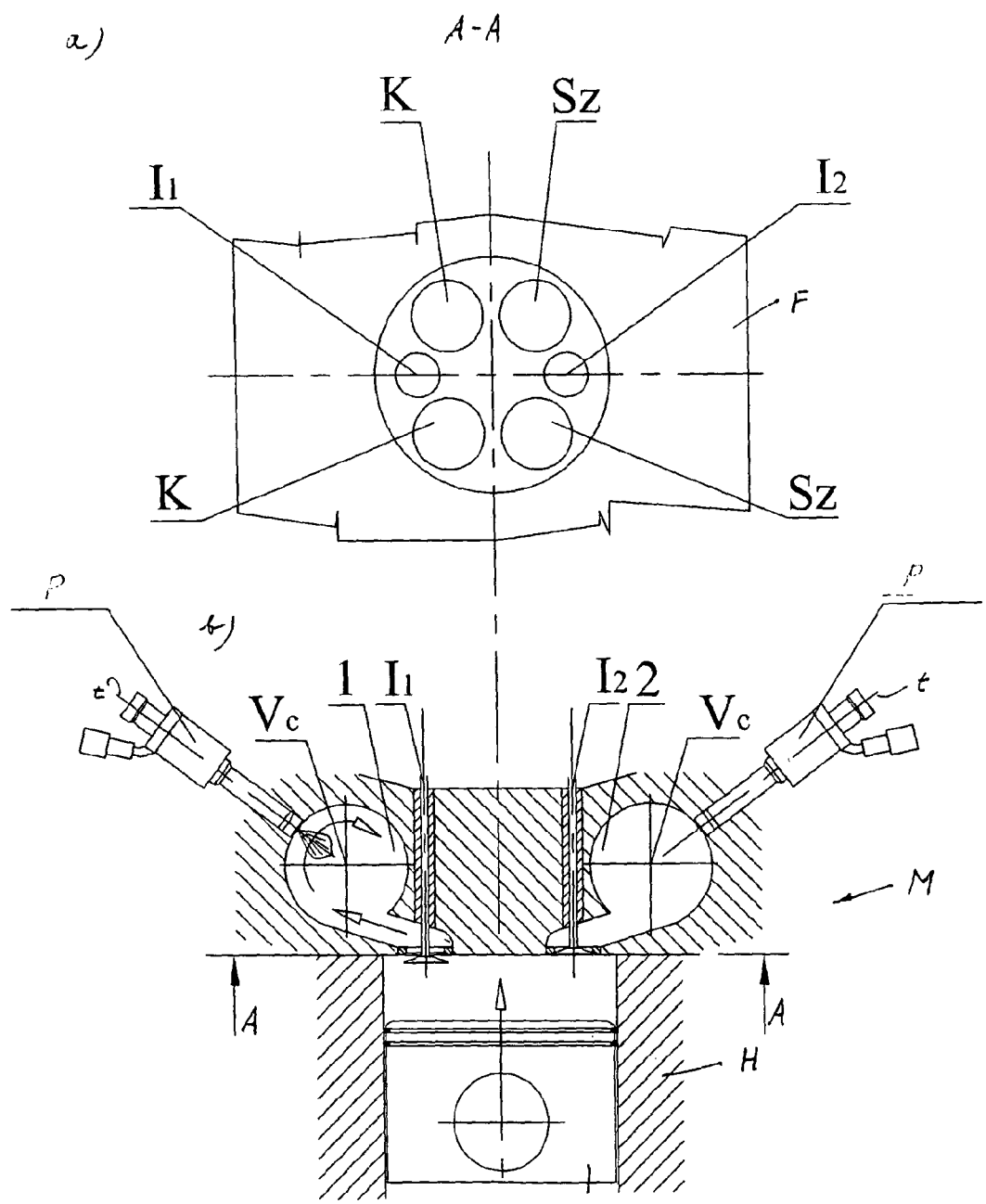
Figure 2:
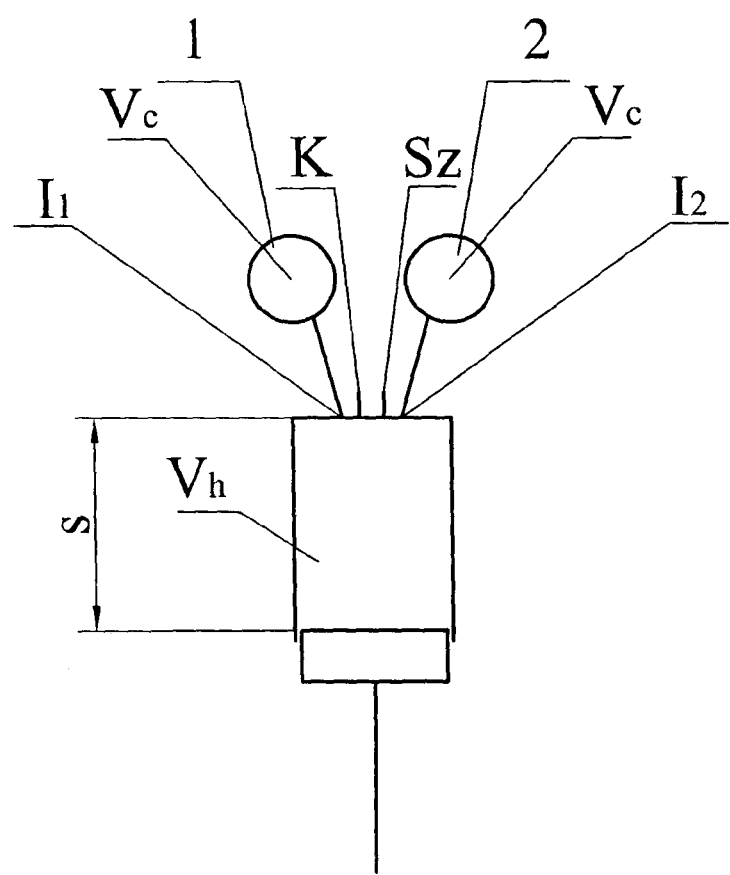

The separation of displacement volume $V_h$ and compression volume $V_c$ by valves is shown generally in FIGS. 1a. and 1b. and schematically in FIG. 2., in the case of a single-cylinder internal combustion engine M (petrol, diesel, gas etc. engine.). The engine M shown in the drawings has two combustion chambers 1,2 with a compression volume $V_c$, a cylinder H with a displacement volume $V_h$ and displacement length S, cylinder head F, a piston D, a suction valve Sz opening directly to the cylinder H, valves $I_1$, $I_2$ opening from the combustion chamber 1,2 to the cylinder H, an exhaust valve K opening from the cylinder H and a crankshaft T (not shown). Suction valve Sz can be connected directly to an air source (ambient air), or a carburettor (not shown).

The cylinder of the engine M has a displacement volume $V_h$, and at least two combustion chambers 1,2 (namely the compression volumes $V_c$) are formed as spheres in the cylinder head F. Displacement volume $V_h$, and combustion chambers 1,2 (he compression volumes $V_c$) can be separated by valves $I_1$, $I_2$. Two subsequent operating cycles of the engine M take place as follows:

While cylinder D is displacing from the inner dead point, suction valve Sz opens and air flows into the cylinder H. Next to the outer dead point the suction valve closes and then the compressed air during the compression stroke flows into the combustion chamber 1 with compression volume $V_c$ through open valve $I_1$. Next to the inner dead point the valve $I_1$ closes, a fuel injection takes place and the charge has burnt. In the meanwhile the valve $I_2$ opens. Gases having a maximum pressure flow from combustion chamber 2 with compression volume $V_c$ into the cylinder H, expand and do work. Next to the outer dead point exhaust valve K open, and exhaust gases flow out while piston D is displacing up to the inner dead point.

While cylinder D is displacing from the inner dead point, suction valve Sz opens and air flows into the cylinder H. Next to the outer dead point the suction valve closes and then the compressed air during the compression stroke flows into the combustion chamber 2 with compression volume $V_c$ through open valve $I_2$. Next to the inner dead point the valve $I_2$ closes, a fuel injection takes place and the charge has burnt. In the meanwhile the valve $I_1$ opens. Gases having a maximum pressure flow from combustion chamber 1 with compression volume $V_c$ into the cylinder H, expand and do work. Next to the outer dead point exhaust valve K open, and exhaust gases flow out while piston D is displacing up to the inner dead point.

Construction of this engine M resembles to that of the diesel-engine with turbulence chamber. However, in this case there are two combustion chambers 1,2—separated from the cylinder H by valves $I_1$, $I_2$—used alternatively by the engine M cycles by cycles. So, the combustion process takes place at a constant compression volume $V_c$, and in addition, it can pass off for a time period of one whole cycle.

Since the combustion process does not form part of the original cycle of the engine M, and it takes place in at least two the combustion chambers 1,2 with compression volumes $V_c$ separated from the displacement volume $V_h$ by valves $I_2$, the time period available for achieving combustion can be increased from $\phi=30\text{-}40°$ to a period lasting 720° revolution of the crankshaft T, that is to period of four full strokes.

The applicant has been found, that this period is suitable for achieving a combustion function $dQ_e/d\phi=f(\phi)$—otherwise known to the person skilled in the art—and consequently creating a $p=f(\phi)$ pressure function in a form having the most adequate slope and length and peakedness, which would be the most favourable in view of operation a given engine M, that is the combustion process can be controlled by carrying out more or several partial injections $b_i$ rather than one injection into the combustion chamber 1,2, between which elementary combustion processes take place. Further, since the compression ratio $\epsilon$ of the petrol engine M with separate combustion chambers 1,2 can be double as well than that of conventional petrol engines, autoignition occurs not only in diesel, but also in petrol engines with separate combustion chambers 1,2.

Therefore, the engine M according to the invention is provided by at least one fuel injection nozzle P extending into each combustion chamber 1,2, which is able to inject fuel into the respective combustion chamber 1,2 by several discrete injections ($b_i$) with short dwells therebetween during the period available.

According to above, the process of controlled combustion and autoignition takes place as follows. Air sucked into the cylinder H and compressed by the piston D flows into the combustion chamber 1 through opened valve $I_1$ (FIG. 3a., stroke 2., section s), and there circulates at elevated velocity. Then, injections occur (FIG. 3a, 3-6 strokes, section é). For example, applying petrol direct injection by means of a piezo-injection nozzle. Such a system is available at Bosch, under the name Motronic HDEV 4 piezo-injection valve for petrol engines (this system is known to a person skilled in the art, therefore, it will not be described here in details). This system enables to make several injections during one combustion stroke.

If a single HDEV injection nozzle P is not enough by combustion chambers for the reasons of control technique, it can be used two as well. Fuel is injected in small quantities by a given number i of partial injections $b_i$ into the combustion chamber 1,2 at different angular positions $\phi$ of the crankshaft T. Combustion process occurs similarly in the combustion chamber 2, too (FIG. 3b.). Consequently, the combustion process is a controlled one, because a combustion function $dQ_e/d\phi=f(\phi)$ and a $p=f(\phi)$ pressure function can be achieved with most adequate slope, length and peakedness, that is developing of pressure is controlled, and value of final pressure can be predetermined.

Preferable constructions of the engine M according to the invention is summarized in Table 2.

TABLE 2

| Features | Number of cylinders | | | |
|---|---|---|---|---|
| | 1 | 2n | 2n + 1 | |
| Number of combustion chambers 1, 2 by cylinders | 2 | 1 | 1 | A combination of constructions in columns 1 and 2n |
| Number of valves $I_1$, $I_2$ by cylinders | 2 | 2 | 2 | |
| Minimum number of suction Sz and exhaust K valves by cylinders | 2 | 2 | 1 | |
| Maximum duration (in degree) of injections and combustion | $\phi = 720°$ | $\phi = 360°$ | $\phi = 360°$ | |
| Heat loading of cylinders achieving power stroke | normal | normal | high | |
| division of work among cylinders | — | none | yes | |

In FIG. 3a. the $p=f(\phi)$ pressure function of gases flowing through the combustion chamber 1, and the operation of valve $l_i$ in function of angular positions $\phi$ of the crankshaft T, that is the valve opening diagrams $p=f(\phi)$ of two subsequently sucked charges of a single-cylinder engine M at full load, and the same diagrams relating to the combustion chamber 2 and valve $I_2$ in FIG. 3b. are shown.

Figure 4:
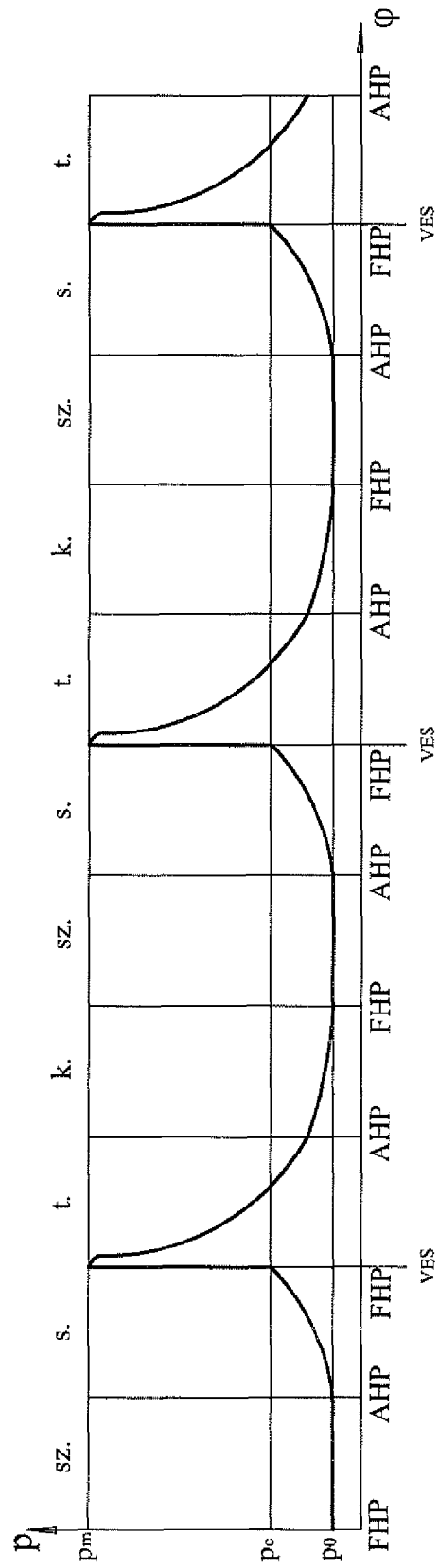

FIG. 4. shows the resultant pressure curve $p=f(\phi)$. FIG. 1 shows the position of injection nozzle P (HDEV piezo injection nozzle P), combustion chamber 1,2 and valves $I_1$, $I_2$.

Figure 3:
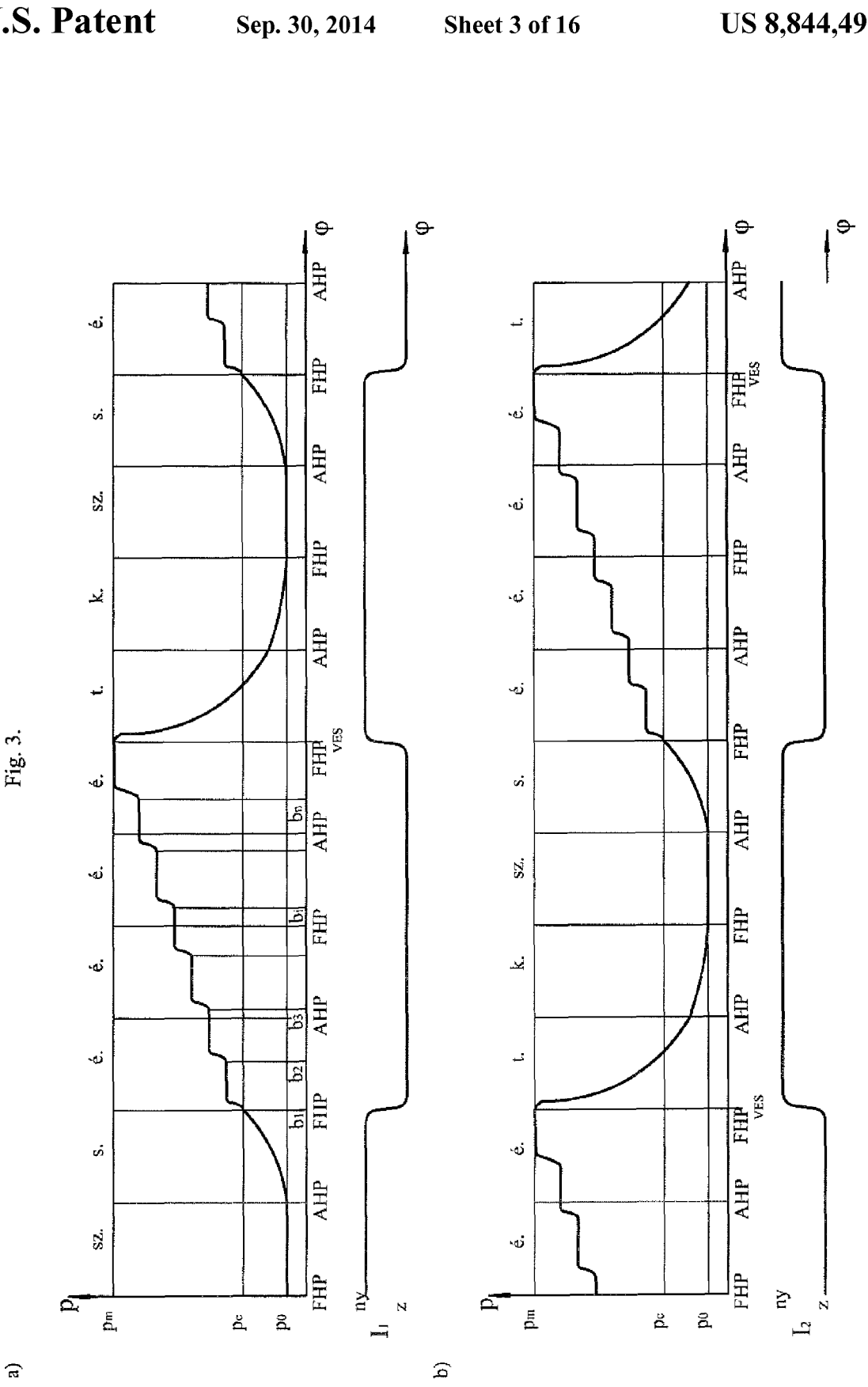

In FIGS. 3. and 4. the following reference marks are used:
p: pressure
p0: ambient pressure
pc: final pressure of compression
pm: final pressure of combustion
$\phi$: angle of rotation of crankshaft
FHP: inner deadline AHP: outer deadline
sz: suction stroke
s: compression stroke
t: expansion stroke
k: exhaust stroke
é: combustion stroke
I1: valve separating the cylinder and combustion chamber 1
I2: valve separating the cylinder and combustion chamber 2
ny: ($I_1$ or $I_2$) valve is open
z: ($I_1$ or $I_2$) valve is closed
bi fuel injection (i=1 ... n)

Since the displacement volume $V_h$ and the compression volume $V_c$ are separated by valves $I_1, I_2$, the time period available for combustion in the engine M is equal to the 720° rotation of the crankshaft T. Arbitrary accomplishment of the combustion process by several injections $b_i$, that is creating a pressure function p=f($\phi$) increasing power and efficiency and decreasing air and noise pollution, takes place by adjusting parameters of the injection system.

By adjusting parameters (injection pressure, stroke of valve P needle, duration of injections, number of injections, etc.) of the injection system one can determine the amount of fuel to be injected. Such an adjustment can be accomplished by a known microprocessor type control system, therefore this will not be described here. For the simpler approach all parameters excluding intervals passed between partial injections $b_i$ at $\Delta\phi$, shall be fixed hereafter including revolution and load of the engine M.

Figure 5:
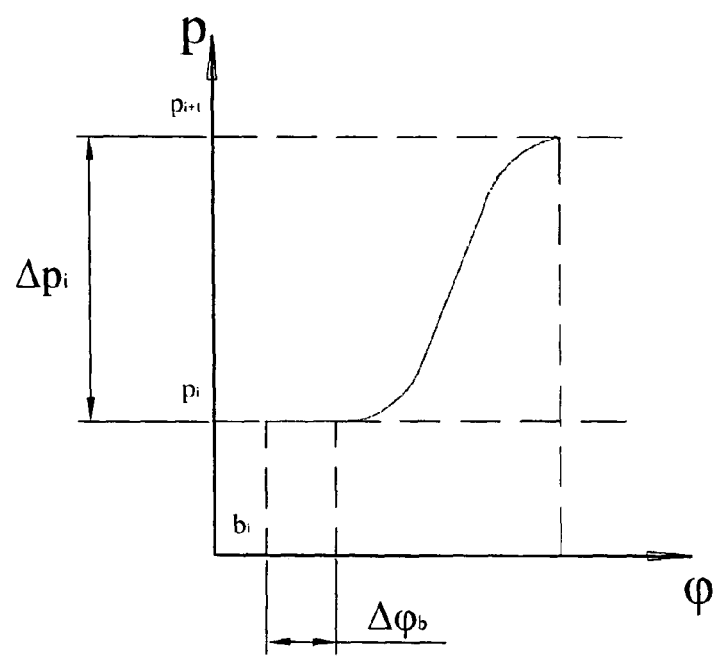
Figure 6:
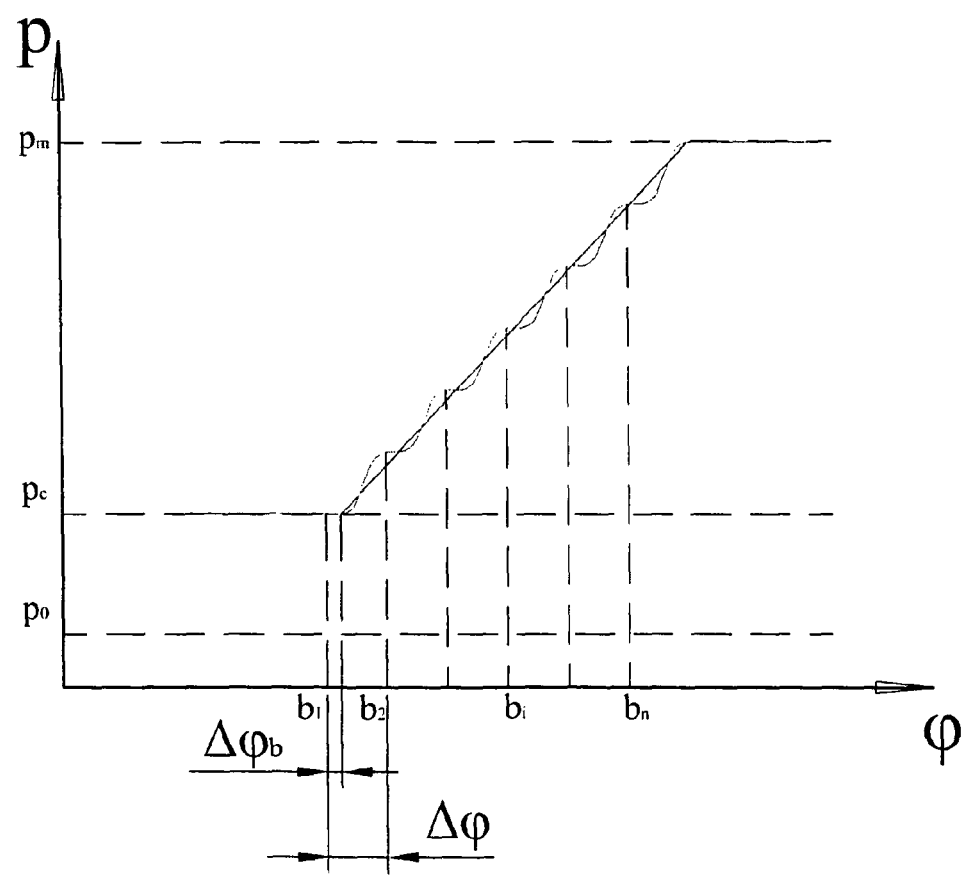

In FIG. 5. an elementary curve p=f($\phi$) is shown. In FIG. 5. the following reference marks are used:
$\Delta$pi: pressure build-up obtained by a partial injection
pi: pressure before the $i^{th}$ partial injection
pi+1: pressure after the $i^{th}$ partial injection
$\phi$: angular revolution of the crankshaft
$\Delta\phi$b: duration of the partial injections
bi: $i^{th}$ partial injection.

The complete curve will be built by i number of elementary curves. The value of pressure buildup to be achieved is $\Delta p_i = (p_m - p_c)/i$. The highest the value of i, the smoother the curve obtained.

The number i of partial injections $b_i$ is at least i=1, preferably between 1 and 6 according to our experiments, but advantageously as high as possible. The highest the value of i, that is the number of partial injections $b_i$, the smaller the deviation of the final combustion pressure $p_m$ to be determined. The number of injections is one in the case of idle operation or partial loads. The elementary amount of fuel to be injected must be determined in such a way, that requested pressure build-up $\Delta p_i$ can be obtained. Although the pressure build-ups obtained by different partial injections $b_i$ of constant fuel quantity would be different because of the continuous variation of thermodynamic characteristic values, this fact is not taken into account for ease.

Figure 7:
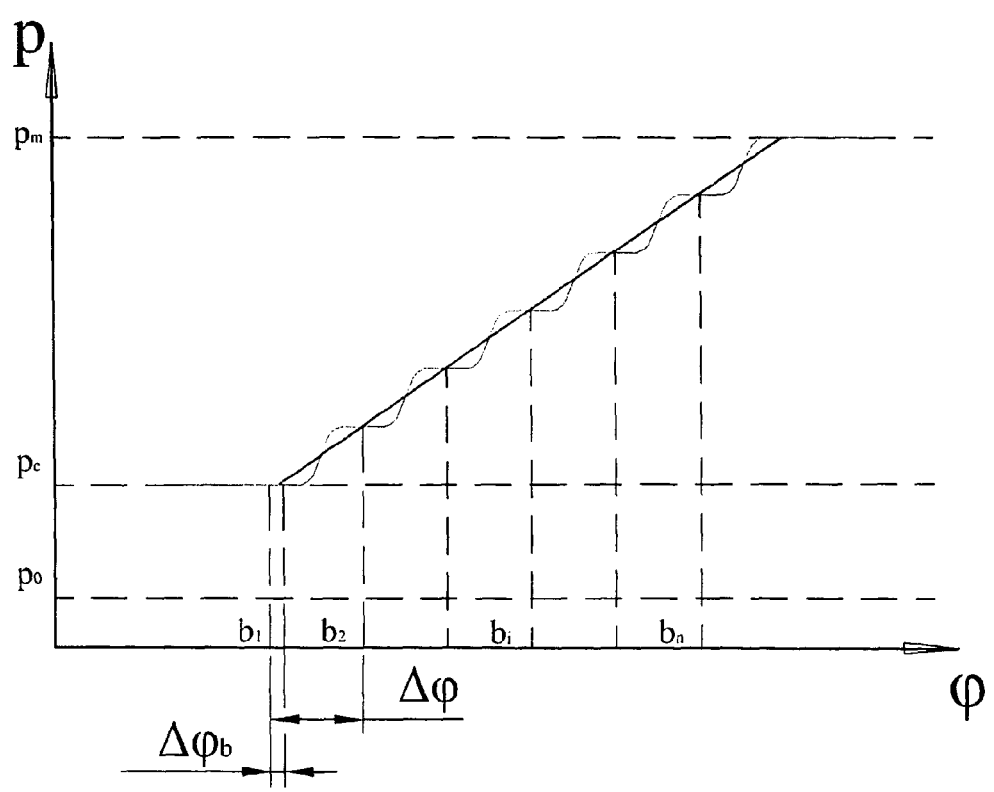
Figure 8:
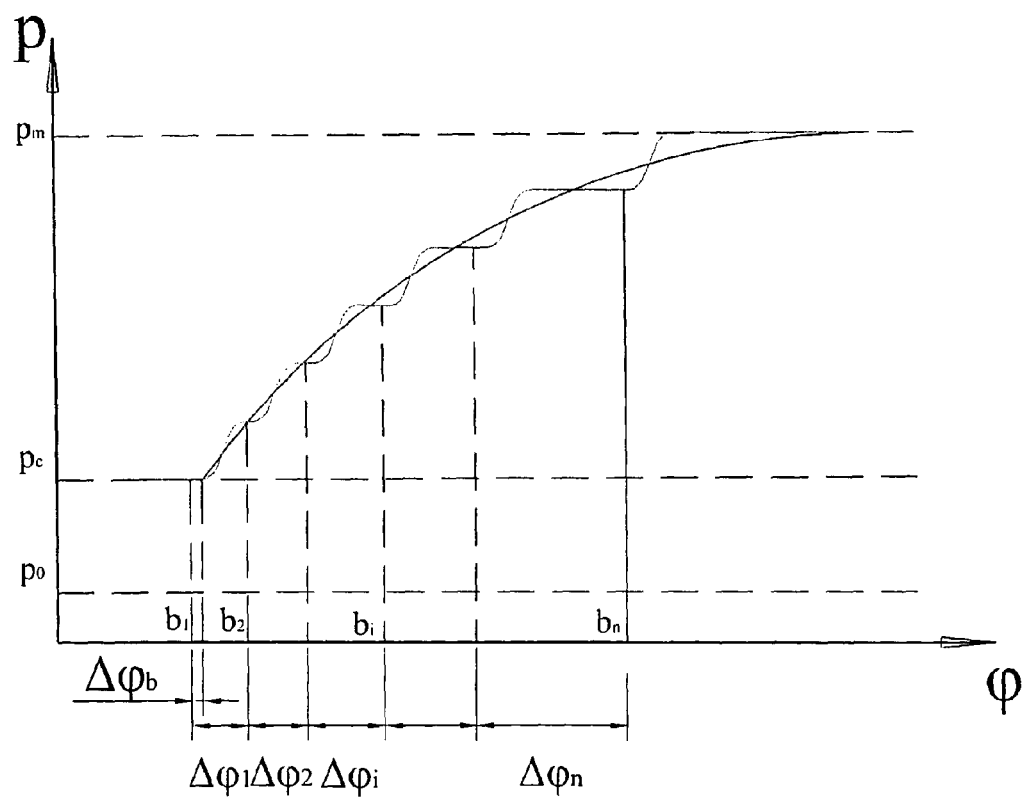

Curve p=f($\phi$) obtained by elementary curves is shown in FIGS. 7. and 8., where
p: pressure
$p_0$: ambient pressure
$p_c$: final compression pressure
$p_m$: final combustion pressure
$\phi$: angle of rotation of crankshaft
$\Delta\phi_b$: duration of the partial injections
$\Delta\phi_1 \ldots \Delta\phi_n$: dwells between partial injections ($b_i$)
$b_1 \ldots b_n$: partial injections In the Figures pressure functions p=f($\phi$) having different characteristics and slopes obtained by elementary curves of number i are shown. At forming this pressure functions only the dwells between partial injections ($b_i$) were altered. It is clearly shown, that one can alter the characteristic of combustion process, so a quality level regulation eliminating the conditions of detonative combustion can be obtained in the whole load range of a petrol engine M as well, with compression ignition.

In FIG. 9. P-V and T-S diagrams of an operating cycle are plotted with losses, where:
p: pressure
V: volume
T: temperature
S: entropy
I.-IV: losses In order to decrease losses caused by incomplete expansion—that does not last up to the ambient pressure—different displacement volumes $V_h$ will be achieved during different parts of the operating cycle (suction+compression, and expansion+discharge). As mentioned above in case of conventional cylinder-piston-crankshaft engines the combustion gases cannot expand up to the ambient pressure during combustion stroke. Some studies show that energy loss relating to this effect is about 13% (% of the heat value). Ideal solution would be if the displacement volume were less during suction and compression strokes than during expansion and exhaust strokes. This way the expansion stroke can continue up to the ambient pressure—in practice, up to an experimentally predetermined pressure optimum.

In FIG. 10., where
Vhsz-s: displacement volume,
Vht-k: displacement volume of expansion and discharge strokes,
Vc: compression volume,
achieving of displacement volumes Vh being different by partial cycles can be followed during different parts of the operating cycle (suction+compression, and expansion+discharge), in case of a single cylinder engine. During suction+compression strokes, when the alternant volume of the cylinder H reaches the Vhsz-s value (FIG. 10.), suction valve closes. This can be done before or after the outer dead point. This way different displacement volumes during different parts of the operating cycle (suction+compression, and expansion+discharge) will be achieved.

The Miller-Atkinson cycle is similar to this, but our solution have substantial differences in view of its object and realization, too. The aim of Miller-Atkinson cycle is decreasing the compression ratio to decrease the compression end pressure and temperature. Pressure drop is compensated by blowing the engine. The charge is cooled between the booster and the cylinders in order to decrease the temperature. This way the compression stoke has been divided into two parts; one part is carried out by the booster and the other is carried out by the cylinder.

But the aim according to the invention is to decrease the losses due to incomplete expansion (FIG. 11.), that is achieved by producing a less displacement volume Vhsz-s during suction-compression stroke, than the displacement volume Vht-k of the expansion-discharge stroke. So the cylinder volume will be V=Vhsz-s+Vc, the compression ratio: $\epsilon_{SZ-S}$=(Vhsz-s+Vc)/Vc during compression, and $\epsilon_{t-k}$=(Vht-k+Vc)/Vc during expansion.

Figure 11:
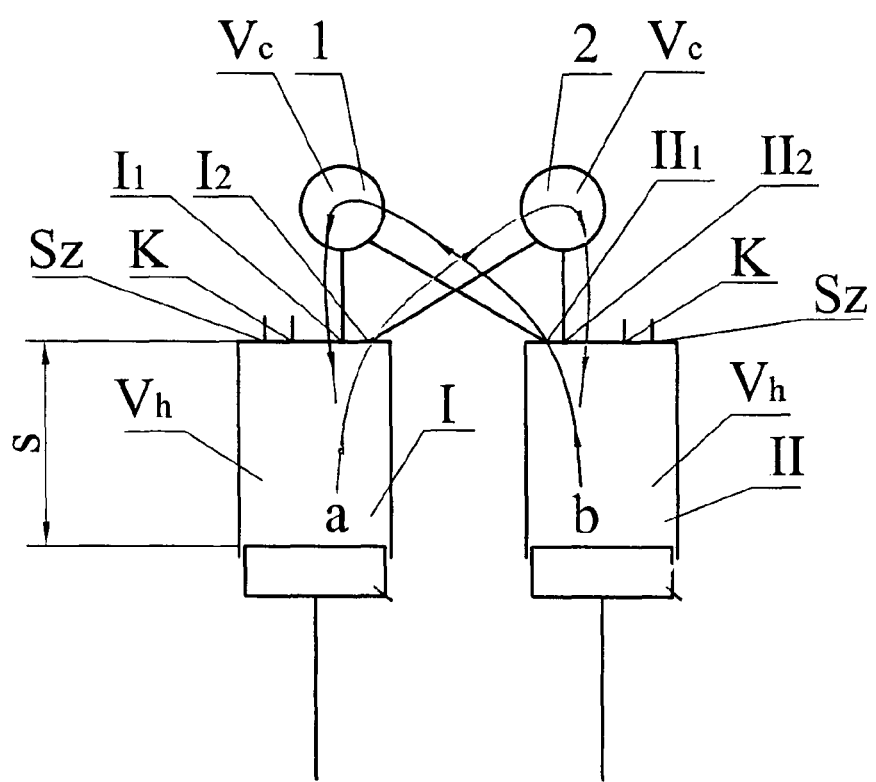
Figure 12:
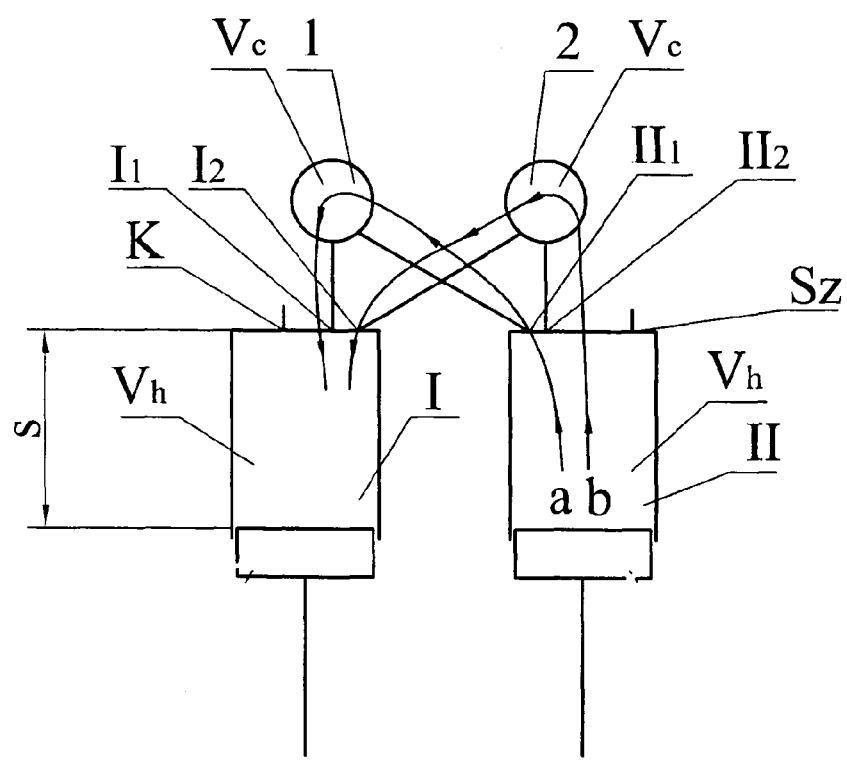

In FIG. 11 achieving of the solution according to the present invention is shown, in case of a double-cylinder engine. In FIG. 11, where:
1, 2: combustion chamber,
I., II.: cylinders,
$V_c$: compression volume, $V_h$: displacement volume,
s: displacement length,
Sz: suction valve,
K: exhaust valve,
$I_1, I_2, II_1, II_2$: valves,
a: path of charge sucked into the cylinder I,
b: path of charge sucked into the cylinder II.
In FIG. 12., where:
1, 2: combustion chamber,
I., II.: cylinders,
$V_c$: compression volume,
$V_h$: displacement volume,
s: displacement length,
Sz: suction valve for fresh charge,
K: exhaust valve,
$I_1, I_2, II_1, II_2$: valves; (i.e.: valve $I_1$ is a valve between cylinder I and a combustion chamber 1),
is shown how the operating cycle is divided into two parts with a double-cylinder engine M.

Figure 13:
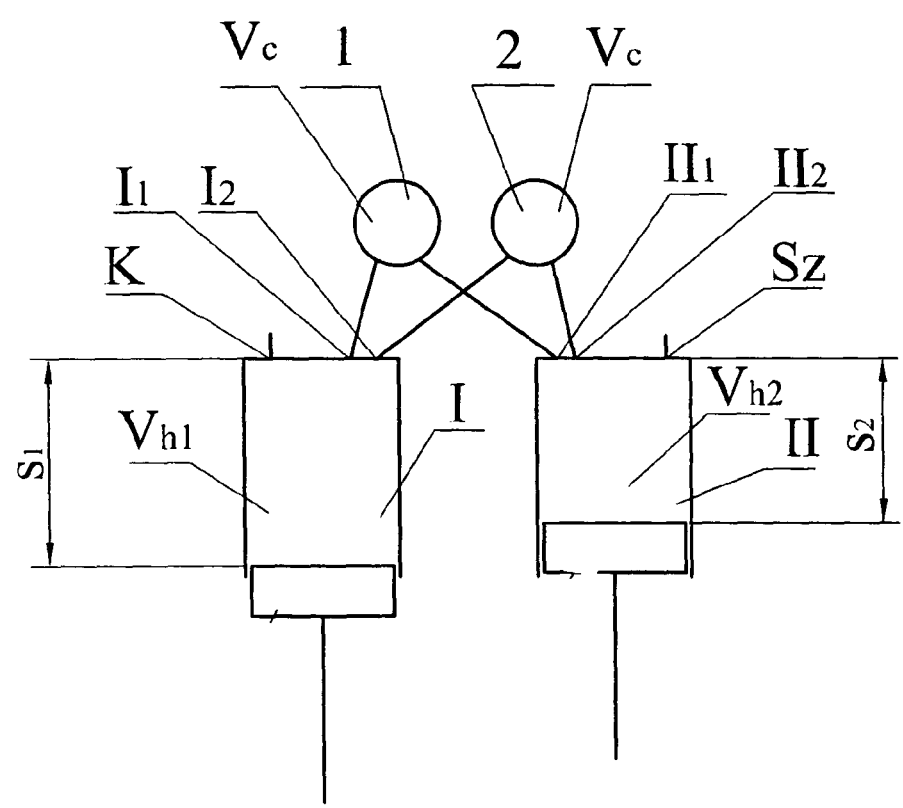
Figure 14:
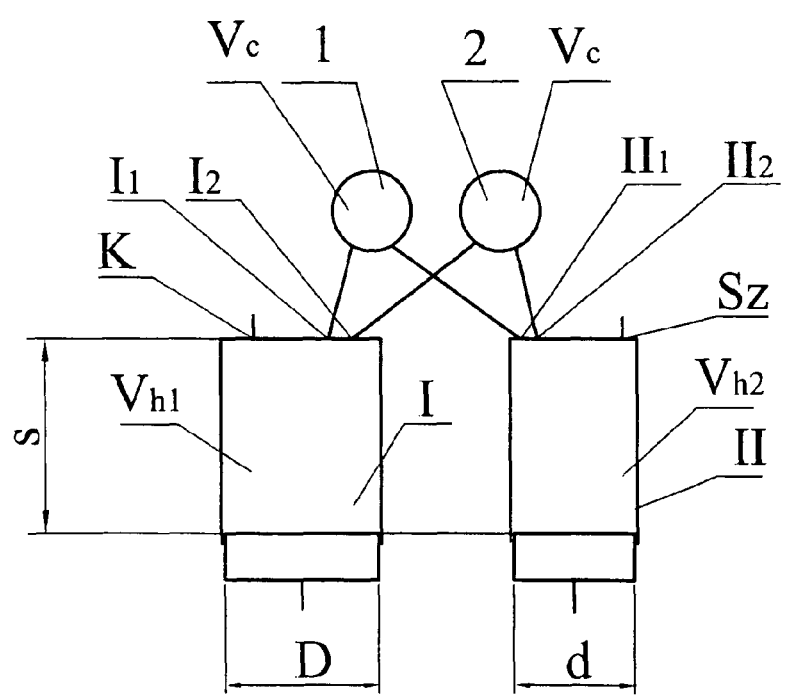

Further, to decrease losses caused by incomplete expansion, which does not take up to the ambient pressure, different displacement volumes shall be achieved according to the invention in different strokes (suction+compression and expansion+discharge) of the operating cycle. Such a construction is shown in FIG. 13., where:
1, 2: combustion chamber,
I., II.: cylinders,
$V_c$: compression volume,
$V_{h1,2}$: displacement volume,
s: displacement length,
Sz: suction valve for fresh charge,
K: exhaust valve,
$I_1, I_2, II_1, II_2$: valves; (i.e.: valve $I_1$ is a valve between cylinder I and a combustion chamber 1),
s1: displacement for cylinder I,
s2: displacement for cylinder II,
cylinders H of a multicylinder engine M are divided into two groups in such a way, that the cylinders of a first group operating as an engine make a part of the whole operating cycle—expansion, discharge —, while cylinders of a second group make the other part of the whole operating cycle—suction of fresh charge, compression—parallel with the other group, on the same crankshaft T. So the original operating cycle is divided into two parts accomplished by the cylinders in the same time. In case the displacement $s_2$ of the cylinders D making suction and compression is selected to be less than that of the cylinders in the other group (making expansion), different displacement volume is achieved at the different strokes of operating cycle (suction+compression and expansion+discharge). This solution is presented in FIG. 13. (also having other alterations). A more simple construction is obtained, when the diameters of the cylinders D are different rather than displacements (FIG. 14.). In FIG. 14.:
1, 2: combustion chamber,
I., II.: cylinders,
$V_c$: compression volume,
$V_{h1}$-$V_{h2}$: displacement volume,
s: displacement length,
Sz: suction valve for fresh charge,
K: exhaust valve,
$I_1, I_2, II_1, II_2$: valves; (i.e.: valve $I_1$ is a valve between cylinder I and a combustion chamber 1),
s: displacement,
D: diameter of the cylinder I,
d: diameter of the cylinder II.

Known HCCI (Homogeneous Charge Compression Ignition) method promises results of high account in the field of fuel and emission reduction, so the applicant pursues to use it on achieving the combustion process according to the invention. By experiments carried out with engines, the HCCI is a combustion process usable with partial loads only, extension of which to the whole load range of the engine has not been succeeded yet by the researchers.

The principal obstacle in the way of extension above is a huge and quick pressure increase emerging at high load (and at high rotational speeds), leading to damage of constructional parts and also unacceptable by making noises.

Figure 15:
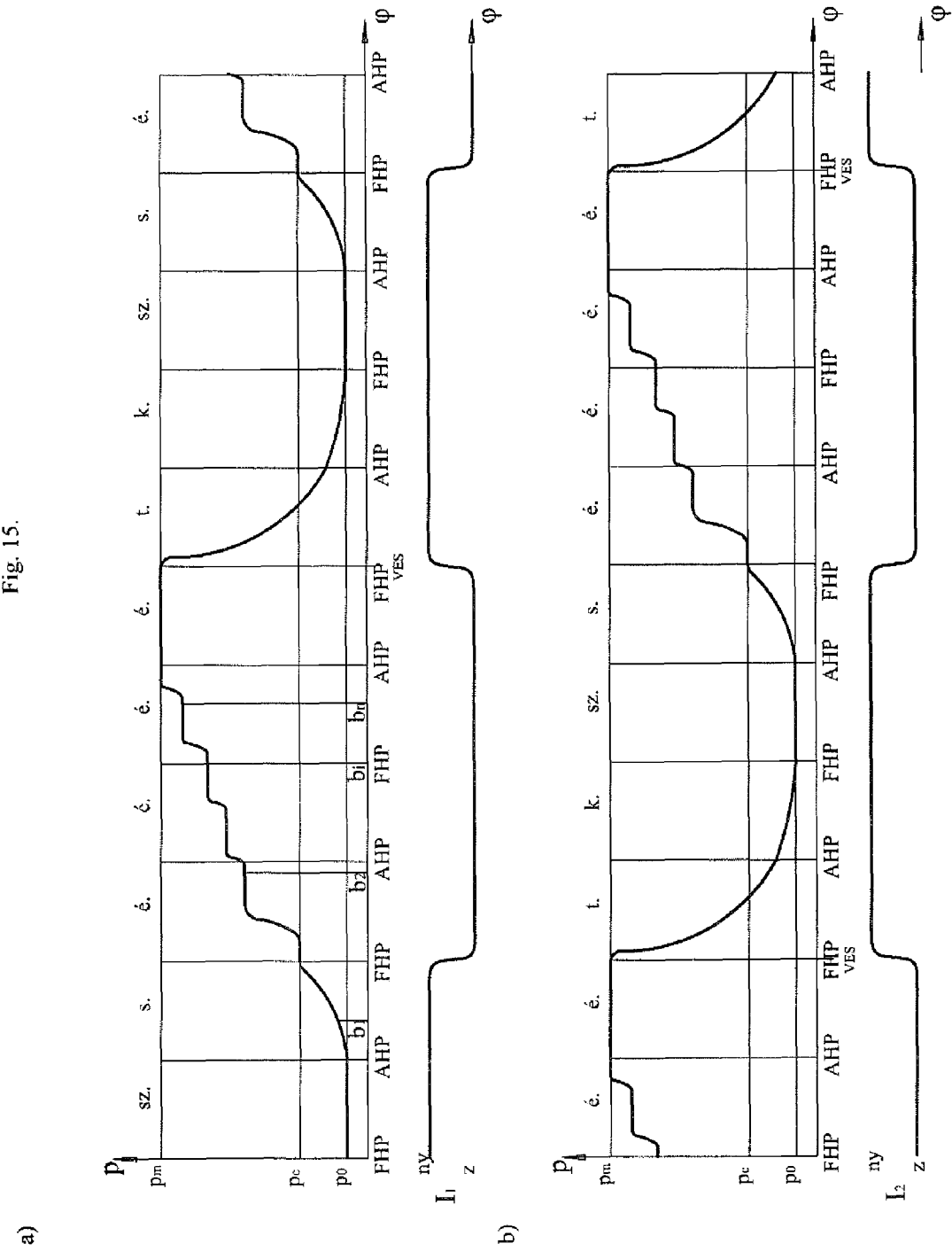

Accordingly the combustion process according to the invention is established by two parts: using HCCI process at partial loads up to a given load level of the engine M, and using a CAI (Controlled Auto Ignition) process at higher loads up to the maximum load (FIG. 15.). The HCCI part of this compound combustion process takes place as follows: the first fuel injection ($b_1$ in FIG. 15.) occurs after the compression stroke, the air and fuel mix up to the end of this stroke, so that a homogenous or partly homogenous mixture is formed in the respective combustion chamber 1,2. A thermo-dynamical state enabling autoignition evolves at the end of the compression and combustion takes place (HCCI phase). The amount fuel injected is proportional to the instant partial load as long as a predetermined optimal maximum value (available in the literature) is reached. In FIG. 15.:
I: cylinder,
p: pressure,
$p_0$: ambient pressure,
$p_c$: final compression pressure,
$p_m$: final combustion pressure,
φ: angular displacement of the crankshaft,
FHP: inner dead point,
AHP: outer dead point,
sz: suction stroke,
s: compression stroke,
t: expansion stroke,
k: exhaust stroke,
é: combustion stroke,
$I_1$: valve between cylinder I and a combustion chamber 1
$I_2$: valve between cylinder I and a combustion chamber 2
ny: ($I_1$ or $I_2$) valve is open
z: ($I_1$ or $I_2$) valve is closed
$b_i$ fuel injection (i=1 . . . n)

When the load of the engine M exceeds a limit just satisfiable by HCCI operating mode, the HCCI operating mode built up by elementary ignition processes will be commenced. With this, the necessary combustion process can be built by a given number of partial fuel injections $b_n$ injected into the combustion chamber 1,2 according to the instant load requirements. For this working method a homogenous mixture cannot be achieved, but one can attempt to do it by whirling of gases.

Alternating two above working methods is a task of an engine control system.

For the conventional—but up to now only experimental—solutions the combustion process is changed to traditional, i.e. SI (Spark Ignition, in case of petrol) combustion process at higher load levels, while for the solution according to the invention it will only be completed by HCCI operating mode built up by elementary ignition processes, so the HCCI process is partly maintained with it advantages.

For explosion engines (particularly for petrol engines) the most important combustion anomaly is the so called detonation (combustion knock), because this phenomenon delimits the highest power and efficiency of an engine having given displacement volume and rotational speed. This phenomenon causes the combustion of the fuel-air mixture taking place in almost a single moment in the cylinder, resulted in increase of density of heat flux (by 50%), amount of heat into the coolant (by 20%), heat exchange coefficient (by 100%) and the specific fuel consumption (by 50%), while the engine output decreases (by 50%). Tendency to detonation is dependent on several factors, like spark lead, air ratio, rotational speed, construction of the combustion chamber, etc., but it is the most reactive to the increase of compression ratio. This is the reason of that the compression ratio almost never exceeds the value of $\epsilon=10$ (normally $\epsilon=7-9$), and rather at partial loads only. At the same time the engine efficiency is substantially influenced by the compression ratio. The theoretical efficiency for so called perfect engine: $\eta_0 = 1 - 1/\epsilon^{K-1}$ where: $\epsilon$ is the compression ratio, $\kappa$ is the isentropic exponent.

Figure 16:
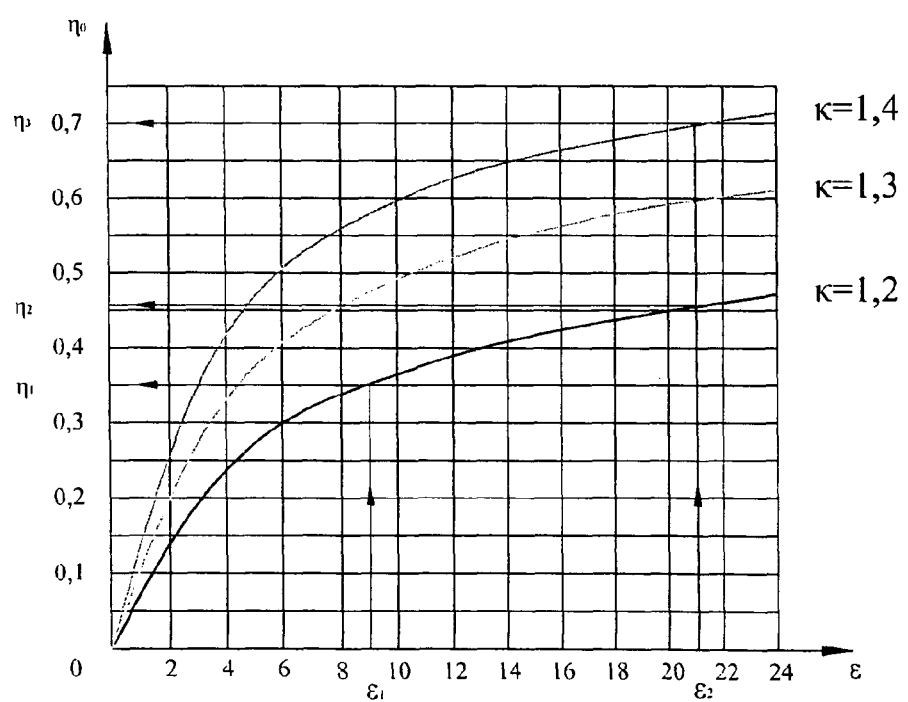

In FIG. 16. the theoretical efficiency of the Otto-cycle is shown against compression ratio, where the parameter is K, the isentropic exponent. In the Figure:

$\epsilon$: compression ratio, $\eta_0$: theoretical efficiency, $\kappa$: isentropic exponent.

Since the $\kappa$ isentropic exponent is also a function of excess air ratio, the value of K decreases by decreasing excess air. Theoretical efficiency of a mean petrol engine is $\eta_0 = 0,356$ if $\epsilon_1 = 9$ and $\kappa = 1,2$, but $\eta_0 = 0,456$ if $\epsilon_2 = 21$ and $\kappa = 1,2$! If the excess air ratio decreases in such an extent, that K approaches ~1,4, theoretical efficiency of the engine is $\eta_0 \sim 0,704$. That is why the efficiency of the Otto-engine can be increased in a most effective manner by achieving a quality regulation of combustion according to the invention at the whole load range of the engine M while using high compression ratio, so that enabling a modified and controlled autoignition and continuously alternating excess air ratio (the amount of fuel). Thus the efficiency of a petrol engine will be improved rather than deteriorated! Since the period of combustion has been lengthen by more than an order and a new combustion process has been achieved as discussed above, an arbitrarily high $\epsilon$ compression ratio can be achieved also for petrol engines and without the risk of detonation, which substantially increases the theoretical efficiency.

The invention claimed is:

1. An internal combustion reciprocating engine (M) comprising an even number of cylinders (H) which are coupled in pairs to each other in parallel arrangement and each cylinder housing a piston (D), at least two separate combustion chambers operatively associated with each pair of cylinders (1,2) separated by valves ($I_1, I_2$ and $II_1, II_2$), respectively, from each cylinder (H), each cylinder having a suction valve (Sz) and an exhaust valve (K) opening therein, and a crankshaft.

2. The internal combustion reciprocating engine (M) according to claim 1, wherein each combustion chamber (1,2) is shaped as a spherical chamber, and an axis (t) of a fuel injection nozzle (P) communicating with each combustion chamber is aligned with a secant line of a circular section lying in a symmetry plane of each combustion chamber.

3. The internal combustion reciprocating engine (M) according to claim 1 wherein the cylinders (H) of each pair of cylinders has a different displacement volume ($V_h$), and a cylinder (H) with less displacement volume ($V_{h2}$) is provided with the suction valve (Sz) and valves ($II_1, II_2$) opening into the combustion chambers (1,2), and a cylinder (H) with more displacement volume ($V_{h1}$) is provided with the exhaust valve (K) and valves ($I_1, I_2$,) opening from the combustion chambers (1,2).

4. The internal combustion reciprocating engine (M) according to claim 3, wherein the cylinders (H) have equal inner diameters (D, d), and a displacement length ($S_2$) of the cylinder (H) with less displacement volume ($V_{h2}$) is less than a stroke length ($S_1$) of the cylinder (H) with more displacement volume ($V_{h1}$).

5. The internal combustion reciprocating engine (M) according to claim 3 wherein the cylinders (H) have equal displacement lengths ($S_2, S_1$), and an inner diameter (d) of the cylinder (H) with less displacement volume ($V_{h2}$) is less than an inner diameter (D) of the cylinder (H) with more displacement volume ($V_{h1}$).

6. The internal combustion reciprocating engine (M) according to claim 1, wherein each combustion chamber (1,2) is shaped as a cylindrical chamber, and an axis (t) of a fuel injection nozzle (P) communicating with each combustion chamber is aligned with a secant line of a circular section lying in a symmetry plane of each combustion chamber.

7. The internal combustion reciprocating engine (M) according to claim 1, wherein each combustion chamber (1,2) is shaped as a toroidal chamber, and an axis (t) of a fuel injection nozzle (P) communicating with each combustion chamber is aligned with a secant line of a circular section lying in a symmetry plane of each combustion chamber.

8. A method to achieve regulation of a combustion process of internal combustion reciprocating engine (M) having a cylinder (H) housing a piston (D) and at least two separate combustion chambers (1,2) separated by valves ($I_1, I_2$) from the cylinder (H), and having a suction valve (Sz) and an exhaust valve (K) both opening to the cylinder, and having a crankshaft (F), the method comprising the steps of opening the suction valve (Sz) in between opening and closing the valve ($I_1, I_2$) and feeding combustion air into a displacement volume ($V_h$) of the cylinder (H), then closing the suction valve (Sz) and forwarding the combustion air into the combustion chambers (1,2), and establishing a combustion process in the combustion chambers (1,2) separated by the valves ($I_1, I_2$) from the displacement volume ($V_h$) of the cylinder (H), opening the suction valve (Sz) in between opening one of the valves ($I_1, I_2$) and closing the same after at most a 720° rotation of the crankshaft (F), then feeding combustion air into the combustion chambers (1,2) through the displacement volume ($V_h$) of the cylinder (H) and closing the suction valve (Sz), then establishing the combustion process in a period lasting between the closing of said one of the valves ($I_1, I_2$) and opening of the same after at most a further 720° rotation of the crankshaft (F) by means of injections ($b_i$) of fuel taking place individually at predetermined angular displacements ($\Delta_\varphi$) of the crankshaft (T) in such a way, that injecting fuel by a given number (i) of injections ($b_i$) into the combustion (1,2) at different angular displacements of the crankshaft (T), and achieving combustion by autoignition.

9. The method according to claim 8, wherein the number (i) of (injections ($b_i$) is preferably 1 to 6.

10. The method according to claim 9, including establishing the combustion process by using two groups of injections ($b_i$) of fuel depending on a load level of the engine (M) in such a way, that using a HCCI process injecting a first quantity of fuel being proportional to the load level of the engine (M) and being in accord with at most an optimal maximum in compression strokes of the piston and using an elementary HCCI process involving injections ($b_2$-$b_n$) injected into a closed combustion chamber (1,2) at higher load levels.

11. The method according to claim 10, including using a single cylinder (H), and closing the suction valve (Sz) at a displacement volume ($V_{hsz-s}$) next to an outer dead point of the piston.

* * * * *